(12) United States Patent
Ueda et al.

(10) Patent No.: US 7,094,832 B2
(45) Date of Patent: Aug. 22, 2006

(54) POLYMER PARTICLES AND PROCESS FOR PRODUCTION THEREOF

(75) Inventors: Takashi Ueda, Takasago (JP); Yoshinori Takeda, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/482,869

(22) PCT Filed: Apr. 28, 2003

(86) PCT No.: PCT/JP03/05415

§ 371 (c)(1), (2), (4) Date: Jan. 6, 2004

(87) PCT Pub. No.: WO03/093353

PCT Pub. Date: Nov. 13, 2003

(65) Prior Publication Data

US 2004/0161607 A1    Aug. 19, 2004

(30) Foreign Application Priority Data

Apr. 30, 2002  (JP) .............................. 2002-128970
May 2, 2002    (JP) .............................. 2002-130892

(51) Int. Cl.
*C08J 3/12* (2006.01)
*C08J 3/26* (2006.01)

(52) U.S. Cl. .................... 525/64; 525/222; 525/227; 525/310; 524/817

(58) Field of Classification Search ............. 525/64, 525/222, 227, 310; 524/817
See application file for complete search history.

(56) References Cited

U.S. PATENT DOCUMENTS

| 4,307,134 A | 12/1981 | Milkovich et al. |
| 4,333,969 A | 6/1982 | Wright et al. |
| 4,333,970 A | 6/1982 | Blommers et al. |
| 4,385,156 A | 5/1983 | Ingram et al. |

FOREIGN PATENT DOCUMENTS

| EP | 0 510 805 A1 | 10/1992 |
| GB | 1087390 | 10/1967 |
| JP | 56-50907 | 5/1981 |
| JP | 57-45558 | 3/1982 |
| JP | 57045558 | 3/1982 |
| JP | 61-64326 | 4/1986 |
| JP | 2000-112174 | 4/2000 |

*Primary Examiner*—James J. Seidleck
*Assistant Examiner*—Olga Asinovsky
(74) *Attorney, Agent, or Firm*—Kenyon & Kenyon LLP

(57) ABSTRACT

The present invention suggests thermoplastic polymer particles for molding, which can solve all at once the problem of fine powder caused by suspension polymerization process, the problem of reducing energy consumption when drying caused by emulsion polymerization process and the problem of the compounding process for processors, and a process for preparing the same. 100 parts by weight of polymer particles having an average particle size of 50 to 500 μm prepared by suspension polymerization are coated with 22 to 100 parts by weight of an emulsion polymer prepared by emulsion polymerization. A polymer suspension comprising the polymer having an average particle size of 50 to 500 μm prepared by suspension polymerization and a polymer latex prepared by emulsion polymerization are mixed in a proportion of 22 to 100 parts by weight of the emulsion polymer based on 100 parts by weight of the suspension polymer. After the solid content concentration of the polymer particles within the suspension of the polymer mixture is adjusted to 25 to 35% by weight, the mixture is contacted with an electrolytic aqueous solution at the Vicat softening temperature of the emulsion polymer or lower. Then, after heating to the Vicat softening temperature of the emulsion polymer or higher, the polymer particles are recovered by solid-liquid separation.

9 Claims, 2 Drawing Sheets

75 μm

200 μm

POLYMER PARTICLES AND PROCESS FOR PRODUCTION THEREOF

This is a 371 national phase application of PCT/JP03/05415 filed on 28 Apr. 2003, claiming priority to JP 2002-128970 filed on 30 Apr. 2002, and JP 2002-130892 filed on 02 May 2002, the contents of which are incorporated herein by reference in their entirety.

TECHNICAL FIELD

The present invention relates to thermoplastic polymer particles for molding prepared by coating polymer particles having an average particle size of 50 to 500 μm obtained by suspension polymerization with a polymer obtained by emulsion polymerization. The present invention also relates to a process for preparing the same.

BACKGROUND ART

Suspension polymerization is widely used industrially as a method for preparing common thermoplastic resin such as vinyl chloride resin, styrene resin, acrylic resin and methacrylic resin, from the viewpoints that controlling polymerization heat is easy and polymer particles can easily be recovered by simply conducting dehydration and drying.

However, when polymer particles are prepared by suspension polymerization, the particle size thereof usually exhibits a broad distribution and fine particle polymers, which are extremely far from the desired particle size, are also produced at the same time. As a result, unwanted results occur, such as filtration properties become extremely poor due to clogging of the filter fabric caused by the fine powder in the dehydrating step, fine powder flows out into the wastewater from dehydration, problems in the steps often occur due to clogging of fine powder, operation environment becomes poor due to generation of dust and risk of dust explosion increases.

The reason that fine powder develops in suspension polymerization is because considerable emulsification is conducted when beginning suspension polymerization as the monomer used in polymerization has some water-solubility or because the monomer drops are over-dispersed, as the monomer is subjected to strong shearing by stirring. Until now, in order to overcome such disadvantages, studies have been conducted such as selecting the type and amount of dispersion stabilizer added when polymerizing regarding the former (JP-A-49-88987) and homogenizing the fluid state by improving the stirring blade regarding the latter. However, even when these methods are used together, completely preventing development of fine particles is difficult in many cases, becoming a large disadvantage to manufacturers with respect to wastewater treatment.

Also, in emulsion polymerization, when granulated and recovered graft copolymer resin is melted and kneaded with rigid plastic, impact strength is exhibited because the graft copolymer is redispersed within the rigid plastic while maintaining the particle size at polymerization. Therefore, emulsion polymerization is widely used as a process for preparing an impact modifier of rigid plastic such as vinyl resin, styrene resin, acrylonitrile-styrene resin, polycarbonate resin and polyether resin.

Usually, in order to recover the desired graft copolymer from an emulsion polymer latex, a granulation step of coagulating and recovering the latex is necessary. The granulation step has a large influence not only on the particle size distribution of the recovered particles, the amount of fine powder and powder properties such as fluidity, but also on productivity of after-treatment such as dehydrating properties and drying properties. Conventionally, in the case of recovering particle polymers from a latex prepared by emulsion polymerization, usually a coagulating agent is added to the latex, a solid-liquid dispersion is formed by the steps of coagulation in the liquid phase and thermal treatment and thereafter, dehydration and drying are conducted to obtain powdery synthetic resin. However, in the case of this method, the shape of the powder is indefinite and problems often occur. For example, problems in the steps often occur, as a considerable amount of fine powder is included, and operation environment becomes poor due to generation of dust. As a result, various improvements have been considered by suggestions of new granulation methods including vapor-phase coagulation (JP-A-52-68285) and delayed coagulation (JP-A-60-217224). However, in spite of such efforts, the amount of water and electric power used in the coagulation step, washing step and drying step of the various granulation methods described above is significantly larger than in suspension polymerization process. From the viewpoint of energy conservation, the above methods are still not satisfactory and development of a new granulation method including designing resin is desired.

On the other hand, in the field of mold processing, a polymer which is usually used as thermoplastic resin, that is a polymer obtained by suspension polymerization which is processed into an article by a molding machine, is hardly processed alone and usually a quality modifying agent such as an impact modifier or processability modifying aid. As mentioned above, such quality modifying agents are usually prepared by emulsion polymerization and recovered as powder. Usually, in order to obtain a molded article with excellent properties, processors conduct the so-called compounding process of adding and mixing a quality-modifying agent to the above polymer and thereafter conducting mold processing. However, the present conditions are that this compounding process is forcing decrease in operational efficiency to processors, as operation environment becomes poor due to generation of dust.

Also, as a toner for developing static-charged images which has excellent frictional charge properties and excellent moisture-absorption properties, JP-A-57-45558 discloses a toner for developing static-charged images comprising particles formed by suspension polymerization and a coating layer comprising fine particles formed by emulsion polymerization on the surface of the particles. However, in this method, after recovering the polymer obtained by suspension polymerization once, the coating step with the polymer obtained by emulsion polymerization is conducted and therefore, this method does not solve the problems of fine powder caused by suspension polymerization.

As a toner in which both adhesion and low-temperature fixation of the toner are achieved, JP-A-2000-112174 discloses a toner for developing static-charged images, in which at least 95% of the surface of the polymer particles obtained by suspension polymerization is coated with a polymer obtained by emulsion polymerization. However, in this method, the polymer solid content concentration of the polymer suspension, when coating the polymer obtained by suspension polymerization with the polymer obtained by emulsion polymerization, is at most 25% and in such conditions, the effect of improving filtration properties cannot be obtained. Also, the average particle size of the polymer obtained by suspension polymerization which is used is 2 to 10 μm, therefore being fine powder itself. Consequently, this method is not a method which solves the problems of fine powder caused by suspension polymerization of the present invention.

U.S. Pat. Nos. 4,307,134, 4,333,969, 4,333,970 and 4,385,156 disclose a method of coating a styrene polymer obtained by suspension polymerization with a polymer obtained by emulsion polymerization for a polymer used in foamed molded articles. However, these methods are not methods which solve the problems of fine powder caused by suspension polymerization.

JP-A-6-179754 discloses a suspension polymer, which contains non-adhesive granulated powder and has a glass transition temperature lower than 50° C., wherein the granulated powder has a non-adhesive coating comprising an emulsion polymer having a glass transition temperature higher than 50° C., and a process for preparing the same. This method is a method which can be used to prevent blocking of the polymer obtained by suspension polymerization which has a low glass transition temperature. Furthermore, a coating with an excess amount of the polymer obtained by emulsion polymerization causes development of fine particles when dehydrating and therefore, the polymer obtained by emulsion polymerization is 2 to 10 parts based on 100 parts of the polymer obtained by suspension polymerization. Consequently, this method is not a method which solves the problems of fine powder caused by suspension polymerization of the present invention.

Furthermore, JP-A-56-50907 discloses the method of partially coagulating an emulsion polymer latex, adding thereto an ethylenic monomer while stirring, converting the polymerization system from an emulsion system to a suspension system and conducting suspension polymerization, as an emulsion-suspension polymerization method. According to this method, a polymer obtained by suspension polymerization which is usually used as thermoplastic resin, and polymer particles obtained by emulsion polymerization, which are an impact modifier, are unified to prepare complex particles. Additionally, when this method is used, the coagulating (granulating) step which is essential for recovering the emulsion polymer latex can be omitted, the obtained particles have an excellent spherical shape and the amount of fine powder is extremely little. Also, granulated particles having low dry load (low water content after dehydration) are obtained and so the amount of energy consumption is more advantageous than in the current emulsion polymerization process. Consequently, the problems of suspension polymerization and emulsion polymerization process can be significantly reduced. However, this method is inferior with respect to productivity, in that increase in viscosity of the system when converting from an emulsion system to a suspension system is remarkable and the total polymerization time to continue conducting suspension polymerization after developing the polymerization scale or completing emulsion polymerization is extremely long.

Therefore, a method which can solve all at once the problem of fine powder caused by suspension polymerization process, the problem of reducing energy consumption when drying caused by emulsion polymerization process and the problem of the compounding process for processors is currently not available.

SUMMARY OF THE INVENTION

That is, the present invention relates to a thermoplastic polymer particle for molding comprising 100 parts by weight of a suspension polymer particle having an average particle size of 50 to 500 μm which is coated with 22 to 100 parts by weight of an emulsion polymer.

The emulsion polymer is preferably 25 to 100 parts by weight.

The emulsion polymer is preferably 30 to 100 parts by weight.

The suspension polymer particle preferably comprises 30 to 100% by weight of (meth)acrylic ester and 0 to 70% by weight of a vinyl monomer copolymerizable therewith.

The emulsion polymer preferably comprises 50 to 90 parts by weight of solid content of a rubber latex comprising 50 to 100% by weight of acrylic ester, 0 to 40% by weight of an aromatic vinyl monomer, 0 to 10% by weight of a vinyl monomer copolymerizable therewith and 0 to 5% by weight of a multifunctional monomer and having a glass transition temperature of at most 0° C., and 10 to 50 parts by weight of a monomer mixture; said monomer mixture comprising 10 to 100% by weight of methacrylic ester, 0 to 90% by weight of an aromatic vinyl monomer, 0 to 25% by weight of a cyanized vinyl monomer and 0 to 20% by weight of a vinyl monomer copolymerizable therewith.

The emulsion polymer is preferably a polymer obtained by adding, in the presence of a polymer latex comprising 70 to 95 parts by weight of a mixture comprising 50 to 95% by weight of methyl methacrylate, 5 to 50% by weight of methacrylic ester having an alkyl group of 2 to 8 carbon atoms and 0 to 20% by weight of a vinyl monomer copolymerizable therewith, 5 to 30 parts by weight of a mixture comprising 20 to 80% by weight of at least one monomer selected from the group consisting of acrylic ester and methacrylic ester excluding methyl methacrylate, 20 to 80% by weight of methyl methacrylate and 0 to 20% by weight of a vinyl monomer copolymerizable therewith, so that the total amount becomes 100 parts by weight; and then graft polymerizing.

The emulsion polymer is preferably an emulsion polymer having a 3 layer structure prepared by obtaining a 2 layer polymer latex by polymerizing 40 to 90 parts by weight of a monomer mixture comprising 60 to 99.9% by weight of alkyl acrylate, 0 to 39.9% by weight of a vinyl monomer copolymerizable therewith and 0.1 to 5% by weight of a crosslinkable monomer, in the presence of 10 to 60 parts by weight of solid content of a polymer latex obtained by polymerizing 40 to 99.99% by weight of methyl methacrylate, 0 to 59.99% by weight of a vinyl monomer copolymerizable therewith and 0.01 to 10% by weight of a crosslinkable monomer; and further polymerizing 11 to 67 parts by weight of a monomer mixture comprising 60 to 100% by weight of (meth)acrylic ester and 0 to 40% by weight of a vinyl monomer copolymerizable therewith, in the presence of 100 parts by weight of solid content of the obtained 2 layer polymer latex.

The present invention relates to a process for preparing a thermoplastic polymer particle for molding which comprises mixing a suspension comprising a suspension polymer having an average particle size of 50 to 500 μm and an emulsion polymer latex in a proportion of 22 to 100 parts by weight of the emulsion polymer based on 100 parts by weight of the suspension polymer particle; adjusting the solid content concentration of polymer particles within the suspension of the polymer mixture to 25 to 35% by weight; contacting the mixture with an electrolytic aqueous solution at the Vicat softening temperature of the emulsion polymer or lower; heating to the Vicat softening temperature or higher; and recovering the polymer particles by solid-liquid separation.

The emulsion polymer is preferably 25 to 100 parts by weight.

The emulsion polymer is preferably 30 to 100 parts by weight.

The solid content concentration of the polymer particles in the mixture comprising the suspension of a suspension polymer and the emulsion polymer latex is preferably 27 to 33% by weight.

The suspension polymer particle preferably comprises 30 to 100% by weight of (meth)acrylic ester and 0 to 70% by weight of a vinyl monomer copolymerizable therewith.

The emulsion polymer particle is preferably obtained by graft polymerizing 50 to 90 parts by weight of solid content of a rubber latex comprising 50 to 100% by weight of (meth)acrylic ester, 0 to 40% by weight an aromatic vinyl monomer, 0 to 10% by weight of a vinyl monomer copolymerizable therewith and 0 to 5% by weight of a multifunctional monomer and having a glass transition temperature of at most 0° C., and 10 to 50 parts by weight of a monomer mixture comprising 10 to 100% by weight of methacrylic ester, 0 to 90% by weight of an aromatic vinyl monomer, 0 to 25% by weight of a cyanized vinyl monomer and 0 to 20% by weight of a vinyl monomer copolymerizable therewith.

The emulsion polymer latex is preferably a polymer obtained by emulsion polymerizing 70 to 95 parts by weight of a mixture comprising 50 to 95% by weight of methyl methacrylate, 5 to 50% by weight of methacrylic ester having an alkyl group of 2 to 8 carbon atoms and 0 to 20% by weight of a vinyl monomer copolymerizable therewith; adding 5 to 30 parts by weight of a mixture comprising 20 to 80% by weight of at least one monomer selected from the group consisting of acrylic ester and methacrylic ester excluding methyl methacrylate, 20 to 80% by weight of methyl methacrylate and 0 to 20% by weight of a vinyl monomer copolymerizable therewith, so that the total amount becomes 100 parts by weight in the presence of the obtained polymer latex; and then graft polymerizing.

The emulsion polymer latex is preferably an emulsion polymer having a 3 layer structure prepared by obtaining a 2 layer polymer latex by polymerizing 40 to 90 parts by weight of a monomer mixture comprising 60 to 99.9% by weight of alkyl acrylate, 0 to 39.9% by weight of a vinyl monomer copolymerizable therewith and 0.1 to 5% by weight of a crosslinkable monomer, in the presence of 10 to 60 parts by weight of solid content of a polymer latex obtained by polymerizing 40 to 99.99% by weight of methyl methacrylate, 0 to 59.99% by weight of a vinyl monomer copolymerizable therewith and 0.01 to 10% by weight of a crosslinkable monomer; and further polymerizing 11 to 67 parts by weight of a monomer mixture comprising 60 to 100% by weight of (meth)acrylic ester and 0 to 40% by weight of a vinyl monomer copolymerizable therewith, in the presence of 100 parts by weight of solid content of the obtained 2 layer polymer latex.

The electrolytic aqueous solution is preferably an aqueous solution of inorganic salt.

DETAILED DESCRIPTION

Figure 1:
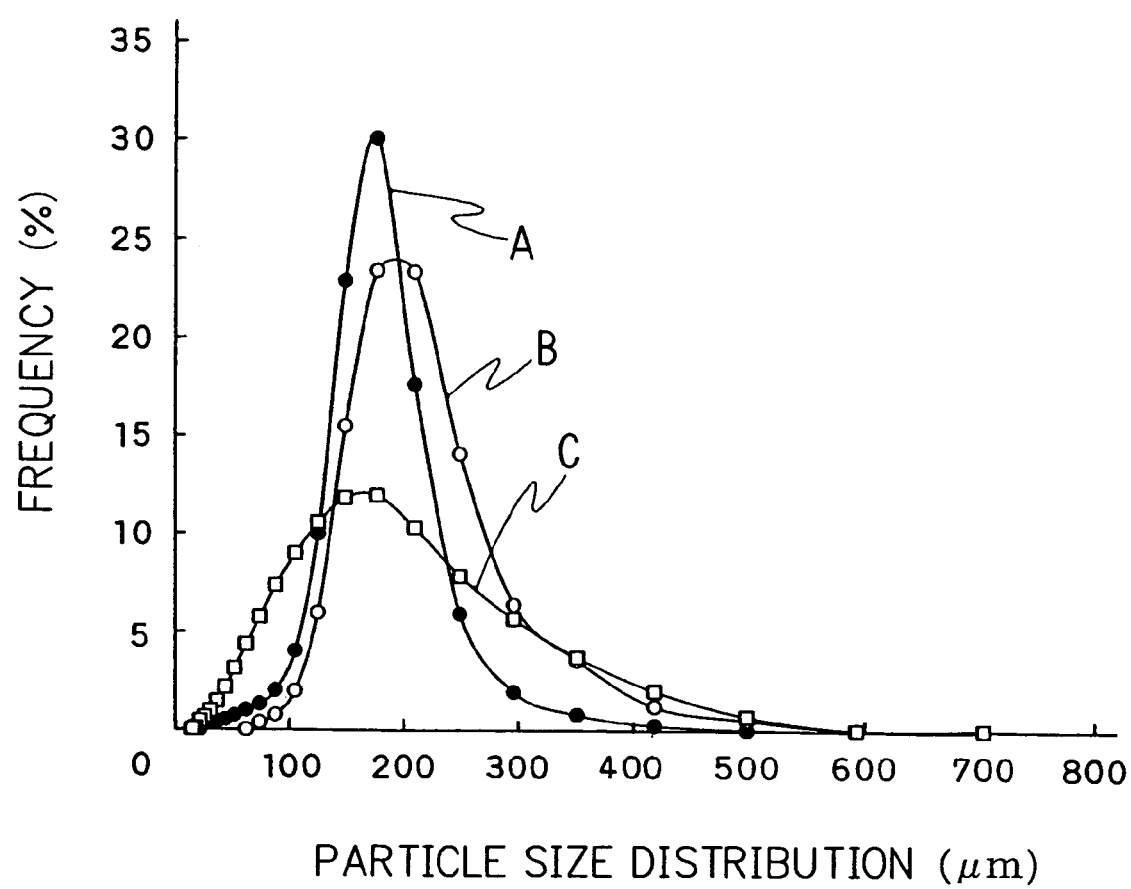
FIG. 1 is a graph depicting particle size distribution.

As the polymer particles obtained by suspension polymerization (hereinafter referred to as suspension polymer) of the present invention, polymer particles with an average particle size of 50 to 500 μm obtained by suspension polymerizing a monomer or monomer mixture are used. The monomer or monomer mixture preferably contains 30 to 100% by weight, more preferably 70 to 100% by weight, of (meth)acrylic ester, from the viewpoint that the effects of controlling dust, which accompanies the obtained polymer, are significant. When the content of (meth)acrylic ester is less than 30% by weight, compatibility with the emulsion polymer used in the present invention when mold processing becomes poor and obtaining a favorable molded article tends to become difficult. The content of the vinyl monomer copolymerizable with the (meth)acrylic ester is preferably 0 to 70% by weight, more preferably 0 to 30% by weight.

Examples of the (meth)acrylic ester are alkyl acrylates having an alkyl group with at most 10 carbon atoms such as methyl acrylate, ethyl acrylate, butyl acrylate and 2-ethylhexyl acrylate and alkyl methacrylates having an alkyl group of at most 10 carbon atoms such as methyl methacrylate, ethyl methacrylate, butyl methacrylate and 2-ethylhexyl methacrylate. These may be used alone or in a combination of two or more kinds. Of these, methyl methacrylate, butyl methacrylate, ethyl acrylate and butyl acrylate are preferable from the viewpoint that a molded article of favorable quality can be obtained in combination with the emulsion polymer used in the present invention.

Examples of the copolymerizable vinyl monomer are vinyl arenes such as styrene, α-methylstyrene, monocholorostyrene and dichlorostyrene; vinyl carboxylic acids such as acrylic acid and methacrylic acid; vinyl cyans such as acrylonitrile and methacrylonitrile; halogenated vinyls such as vinyl chloride, vinyl bromide and chloroprene; alkenes such as vinyl acetate, ethylene, propylene, butylene, butadiene and isobutylene; halogenated alkenes; and multifunctional monomers such as allyl methacrylate, diallyl phthalate, triallyl cyanurate, monoethylene glycol dimethacrylate, tetraethylene glycol dimethacrylate, divinyl benzene and glycidil methacrylate. These may be used alone or in a combination of two or more kinds. Of these, styrene, α-methylstyrene, acrylic acid, methacrylic acid, acrylonitrile, vinyl acetate, allyl methacrylate and glycidil methacrylate are preferable from the viewpoint that a molded article of favorable quality can be obtained in combination with the emulsion polymer used in the present invention.

The suspension polymer particles are polymer particles of one kind or at least two kinds of polymers obtained by copolymerizing or graft polymerizing a monomer composition mainly containing one or at least two kinds of the above monomers.

The average particle size of the suspension polymer particles is 50 to 500 μm which is obtained in the usual suspension polymerization, and is preferably 75 to 300 μm, more preferably 100 to 250 μm. When the average particle size is less than 50 μm, filtration properties tends to become poor. When the particle size is more than 500 μm, in the case that a powder compounding agent is mixed with the thermoplastic polymer particles for molding of the present invention, homogeneity when mixing with the compounding agent tends to become poor.

As the dispersion stabilizer in suspension polymerization, the usual inorganic dispersant or organic dispersant can be used. Examples of the inorganic dispersant are magnesium carbonate and calcium tertiary phosphate. Examples of the organic dispersant are natural products such as starch, gelatin, acrylamide, partially hydrolyzed polyvinyl alcohol, partially hydrolyzed polymethyl methacrylate, polyacrylic acid and salt thereof, cellulose, methyl cellulose, hydroxy methyl cellulose, hydroxy ethyl cellulose, polyalkylene oxide, polyvinyl pyrrolidone, polyvinyl imidazole and sulfonated polystyrene; a synthetic polymer dispersant; a low molecular weight dispersant such as alkyl benzene sulfonate and fatty acid salt; and an emulsifier.

Examples of the polymerization initiator in suspension polymerization are peroxides such as benzoyl peroxide and lauroyl peroxide and azo compounds such as azobisisobutyronitrile.

Also, in order to adjust molecular weight, a chain transfer agent may be used. Examples of the chain transfer agent are mercapto acid such as alkyl mercaptan having 2 to 18 carbon atoms, thioglycolic acid ester and β-mercapto propionic acid, benzyl mercaptan and aromatic mercaptan such as thiophenol, thiocresol and thionaphthol. Of these, alkyl mercaptan having 4 to 12 carbon atoms is preferable.

The amount of the dispersion stabilizer, initiator and chain transfer agent can be set accordingly, depending on the monomer which is used and the properties of the suspension polymer particles.

Examples of the method for preparing the suspension polymer particles are the method of suspending the monomer or monomer mixture in water and then conducting polymerization reaction, the method of conducting polymerization reaction by suspending part of the monomer or monomer mixture in water to start the polymerization reaction and adding the water suspension of the remaining monomer or monomer mixture in one stage or several stages or continuously to the polymerization reaction bath as polymerization reaction progresses and the method of conducting polymerization reaction by suspending part of the monomer or monomer mixture in water to start polymerization and adding the remaining monomer or monomer mixture in one stage or several stages or continuously to the polymerization reaction bath as polymerization reaction progresses. The method is not limited thereto and all methods which can usually be used can be employed.

The method for adding the polymerization initiator and chain transfer agent is not particularly limited but the method of dissolving both the polymerization initiator and chain transfer agent in the monomer, suspending the monomer in water and then conducting polymerization reaction is preferable. The time required for polymerization differs according to the type and amount of the initiator or the polymerization temperature, but is usually 1 to 24 hours. Also, when suspension polymerizing, components usually added when mold processing rigid plastic, such as a plasticizer, lubricant, stabilizer and ultraviolet ray absorbing agent can be added to the monomer.

The polymer particles obtained by emulsion polymerization (hereinafter referred to as emulsion polymer) of the present invention are preferably emulsion polymers obtained by emulsion polymerizing a vinyl monomer. More preferably, the polymer particles are (1) emulsion polymer particles obtained by graft polymerizing 50 to 90 parts by weight of solid content of a rubber latex comprising 50 to 100% by weight of (meth)acrylic ester, 0 to 40% by weight an aromatic vinyl monomer, 0 to 10% by weight of a vinyl monomer copolymerizable therewith and 0 to 5% by weight of a multifunctional monomer and having a glass transition temperature of at most 0° C., and 10 to 50 parts by weight of a monomer mixture comprising 10 to 100% by weight of methacrylic ester, 0 to 90% by weight of an aromatic vinyl monomer, 0 to 25% by weight of a cyanized vinyl monomer and 0 to 20% by weight of a vinyl monomer copolymerizable therewith. Further preferably, the polymer particles are (2) emulsion polymer particles obtained by emulsion polymerizing 70 to 95 parts by weight of a mixture comprising 50 to 95% by weight of methyl methacrylate, 5 to 50% by weight of methacrylic ester having an alkyl group of 2 to 8 carbon atoms and 0 to 20% by weight of a vinyl monomer copolymerizable therewith; adding in the presence of the produced polymer latex 5 to 30 parts by weight of a mixture comprising 20 to 80% by weight of at least one monomer selected from the group consisting of acrylic ester and methacrylic ester excluding methyl methacrylate, 20 to 80% by weight of methyl methacrylate and 0 to 20% by weight of a vinyl monomer copolymerizable therewith, so that the total amount becomes 100 parts by weight; and then graft polymerizing. Most preferably, the polymer particles are (3) emulsion polymer particles having a 3 layer structure prepared by obtaining a 2 layer polymer latex by polymerizing 40 to 90 parts by weight of a monomer mixture comprising 60 to 99.9% by weight of alkyl acrylate, 0 to 39.9% by weight of a vinyl monomer copolymerizable therewith and 0.1 to 5% by weight of a crosslinkable monomer, in the presence of 10 to 60 parts by weight of solid content of a polymer latex obtained by polymerizing 40 to 99.99% by weight of methyl methacrylate, 0 to 59.99% by weight of a vinyl monomer copolymerizable therewith and 0.01 to 10% by weight of a crosslinkable monomer; and further polymerizing 11 to 67 parts by weight of a monomer mixture comprising 60 to 100% by weight of (meth)acrylic ester and 0 to 40% by weight of a vinyl monomer copolymerizable therewith, in the presence of 100 parts by weight of solid content of the obtained 2 layer polymer latex.

The usual method for preparing the emulsion polymer particles (1) to (3) are described in detail in JP-A-2-269755 and JP-A-8-217817.

The reason that the emulsion polymer particles (1) to (3) are suitably used is because the emulsion polymer particles are widely used as a quality modifying agent of thermoplastic resin and in the case of recovering as polymer particles of the present invention, the various quality-improving effects thereof can be exhibited. More specifically, emulsion polymer (1) is preferable in view of improving impact strength of the molded article obtained by mold processing the thermoplastic polymer particles for molding of the present invention and emulsion polymer (2) is preferable in view of improving molding processability of the thermoplastic polymer particles for molding of the present invention. Also, emulsion polymer (3) is preferable in view of improving impact strength and transparency of the molded article obtained by mold processing the thermoplastic polymer particles for molding of the present invention.

However, the emulsion polymer of the present invention is not particularly limited to the above emulsion polymers and one kind or at least two kinds of polymer latex particles obtained by copolymerizing or graft polymerizing a monomer composition mainly containing one or at least two kinds of monomers selected from the following group of monomers can be used. Herein, "mainly containing" means that the monomer composition contains at least 50% by weight of the following monomers.

Examples of the monomer are alkyl acrylates having an alkyl group with at most 10 carbon atoms such as methyl acrylate, ethyl acrylate, butyl acrylate and 2-ethylhexyl acrylate and alkyl methacrylates having an alkyl group of at most 10 carbon atoms such as methyl methacrylate, ethyl methacrylate, butyl methacrylate and 2-ethylhexyl methacrylate, vinyl arenes such as styrene, δ-methylstyrene, monocholorostyrene and dichlorostyrene; vinyl carboxylic acids such as acrylic acid and methacrylic acid; vinyl cyans such as acrylonitrile and methacrylonitrile; halogenated vinyls such as vinyl chloride, vinyl bromide and chloroprene; alkenes such as vinyl acetate, ethylene, propylene, butylene, butadiene and isobutylene; and multifunctional monomers such as allyl methacrylate, diallyl phthalate, triallyl cyanurate, monoethylene glycol dimethacrylate, tetraethylene glycol dimethacrylate, divinyl benzene and glycidil methacrylate.

The average particle size of the emulsion polymer particles is not particularly limited but the average particle size usually obtained by emulsion polymerization of 0.05 to 0.5 μm is preferable and 0.06 to 0.3 μm is more preferable. When the average particle size is outside this range, processability when mold processing the thermoplastic polymer particles for molding of the present invention and impact strength and transparency of the obtained molded article tend to become poor.

The solid content of the rubber latex, described in the preferable emulsion polymer (1), comprising 50 to 100% by weight of acrylic ester, 0 to 40% by weight of an aromatic vinyl monomer, 0 to 10% by weight of a vinyl monomer copolymerizable therewith and 0 to 5% by weight of a multifunctional monomer, preferably has a glass transition temperature of at most 0° C., more preferably at most −30° C. When the glass transition temperature of the emulsion polymer is more than 0° C., improvement in impact strength of the molded article, obtained by mold processing the thermoplastic polymer particles for molding of the present invention, tends to be prevented.

The process for preparing the thermoplastic polymer particles for molding of the present invention comprises the step of preparing a suspension of a suspension polymer comprising suspension polymer particles having an average particle size of 50 to 500 μm prepared by suspension polymerization, a step of mixing 22 to 100 parts by weight of an emulsion polymer latex based on 100 parts by weight of the suspension polymer particles, a step of adjusting the solid content concentration of the suspension of the polymer mixture within the mixture to 25 to 35% by weight, a step of adding an electrolytic aqueous solution to the suspension of the polymer mixture at the Vicat softening temperature of the emulsion polymer or lower, a step of heating the suspension of the polymer mixture to the Vicat softening temperature of the emulsion polymer or higher and a step of recovering the thermoplastic polymer particles for molding by solid-liquid separation. According to the preparation process of the present invention, the surface of the suspension polymer particles can be evenly coated with the emulsion polymer and remaining fine particle polymers, which cause filtration properties to become poor, can be significantly reduced.

As the process for mixing the suspension of a suspension polymer prepared by suspension polymerization and the emulsion polymer latex prepared by emulsion polymerization, preferably, the emulsion polymer latex is added to the suspension of a suspension polymer or the suspension of a suspension polymer is added to the emulsion polymer latex, while stirring. By mixing the suspension of a suspension polymer and the emulsion polymer latex prepared by emulsion polymerization, a suspension of the polymer mixture can be obtained.

The solid content ratio of the suspension polymer and emulsion polymer of the polymer particles of the present invention is 22 to 100 parts by weight preferably 25 to 100 parts by weight, more preferably 30 to 100 parts by weight, of the emulsion polymer based on 100 parts by weight of the suspension polymer. When the emulsion polymer is less than 22 parts by weight based on 100 parts by weight of the suspension polymer, fine particle polymers remain in the system even after adding the electrolytic aqueous solution and as a result, the effect of improving filtration properties cannot be observed, thus being unfavorable. Also, when the emulsion polymer is more than 100 parts by weight based on 100 parts by weight of the suspension polymer, the water content after dehydration of the obtained polymer becomes high, thus being unfavorable.

When mixing the emulsion polymer latex and the suspension of a suspension polymer, the solid content concentration of the emulsion polymer latex and the suspension of a suspension polymer is not particularly limited. Using the emulsion polymer latex or suspension of a suspension polymer as obtained by the usual polymerization process is most simple in view of production and therefore more preferable. Usually, the solid content concentration of the emulsion polymer latex is preferably 25 to 55% by weight, more preferably 25 to 45% by weight, further preferably 30 to 45% by weight, most preferably 30 to 40% by weight. The solid content concentration of the suspension of a suspension polymer is 25 to 55% by weight, more preferably 30 to 45% by weight, further preferably 33 to 45% by weight, most preferably 35 to 40% by weight. The temperature when mixing is preferably at least 5° C. and when lower than 5° C., the amount of utility use in the thermal treatment process thereafter becomes large, tending to become unfavorable.

Furthermore, the solid content concentration of the polymer particles within the suspension of the polymer mixture of the suspension polymer and the emulsion polymer is preferably 25 to 35% by weight, more preferably 27 to 33% by weight. When the solid content concentration of the polymer particles within the suspension of the polymer mixture when adding the electrolytic aqueous solution is less than 25% by weight, extremely small coagulates with a particle size of at most 50 μm often develop in the polymer suspension, after the electrolytic aqueous solution is added and heating treatment is conducted. Also, filtration properties become poor and water content after dehydration becomes high. When the solid content concentration of the polymer particles within the suspension of the polymer mixture when adding the electrolytic aqueous solution is more than 35% by weight, secondary coagulate particles, in which the particles adhere via the emulsion polymers, often develop and water content after dehydration becomes high.

Subsequently, when preparing the polymer particles of the present invention, an electrolytic aqueous solution is contacted with the suspension of the polymer mixture of the suspension of a suspension polymer and emulsion polymer latex. Contact with the electrolytic aqueous solution is preferably conducted by adding the electrolytic aqueous solution to the suspension of the polymer mixture of the suspension of a suspension polymer and the emulsion polymer latex while stirring. According to this process, the emulsion polymer particles and fine particle polymers produced by suspension polymerization coagulate (precipitate) on the surface of the suspension polymer particles to coat the surface of the suspension polymer particles.

The electrolytic aqueous solution which can be used in the present invention is an aqueous solution of organic acid (salt) or inorganic acid (salt) having the properties of being able to coagulate the polymer latex. Examples are aqueous solutions of inorganic salts such as sodium chloride, potassium chloride, lithium chloride, sodium bromide, potassium bromide, lithium bromide, potassium iodide, sodium iodide, potassium sulfate, sodium sulfate, ammonium sulfate, ammonium chloride, sodium nitrate, potassium nitrate, calcium chloride, ferrous sulfate, magnesium sulfate, zinc sulfate, copper sulfate, barium chloride, ferrous chloride, ferric chloride, magnesium chloride, ferric sulfate, aluminum sulfate, potassium alum and iron alum, aqueous solutions of inorganic acids such as hydrochloric acid, sulfuric acid, nitric acid and phosphoric acid, organic acids such as acetic acid and formic acid and aqueous solutions thereof and aqueous solutions of organic salts such as sodium acetate, calcium acetate, sodium formate and calcium formate. These may be used alone or by mixing two or more kinds. Of these, from the viewpoint of evenness in coating the surface of the suspension polymer particle with the emulsion polymer, significantly reducing the remaining fine particle polymers which cause filtration properties to become poor and ease in wastewater treatment, aqueous solutions of inorganic salts such as sodium chloride, potassium chloride, sodium sulfate, ammonium chloride, calcium chloride, magnesium chloride, magnesium sulfate, barium chloride, ferrous chloride, aluminum sulfate, potassium alum and iron alum and aqueous solutions of inorganic acids such as hydrochloric acid, sulfuric acid and nitric acid can suitably be used.

The concentration of the electrolytic aqueous solution used in the present invention is preferably at least 0.001% by weight, more preferably at least 0.1% by weight, further preferably at least 1% by weight. When the concentration of the electrolytic aqueous solution is less than 0.001% by weight, a large amount of the electrolytic aqueous solution must be added to coagulate the emulsion polymer particles and the amount of utility use in the thermal treatment process thereafter becomes large, thus being unfavorable.

The electrolytic aqueous solution must be added to the mixture of the suspension of a suspension polymer and the emulsion polymer latex of the present invention at the Vicat softening temperature of the emulsion polymer particles or lower. When the temperature of the mixture of the suspension of a suspension polymer and the emulsion polymer latex is higher than the Vicat softening temperature of the emulsion polymer when adding the electrolytic aqueous solution, the shape of the produced polymer particles are distorted and the water content after dehydration becomes high. Also, uncoagulated emulsion polymers remain, causing filtration properties to become extremely poor, and coagulation between polymer particles often tends to occur.

In the present invention, the electrolytic aqueous solution must be added to the mixture of the suspension of a suspension polymer and the emulsion polymer latex after mixing the suspension of a suspension polymer and emulsion polymer latex. The reason is because if the electrolytic aqueous solution is present when mixing the suspension of a suspension polymer and the emulsion polymer latex, not only are the shape of the produced polymer particles distorted and the water content after dehydration high, but also uncoagulated emulsion polymers remain and filtration properties tend to become extremely poor. For example, if the polymer latex is added after the electrolytic aqueous solution is added to the suspension of a suspension polymer, problems occur such as decrease in evenness of the emulsion polymer coating on the surface of the suspension polymer particles and significant increase in the amount of remaining fine particle polymers, which cause filtration properties to become poor.

The thermoplastic polymer particles for molding of the present invention are thermoplastic polymers prepared by coating 100 parts by weight of suspension polymer particles with 22 to 100 parts by weight of an emulsion polymer. The emulsion polymer is preferably 25 to 100 parts by weight, more preferably 30 to 100 parts by weight. When the emulsion polymer is less than 22 parts by weight based on 100 parts by weight of the suspension polymer, fine particle polymers remain in the system even after the electrolytic aqueous solution is added and as a result, the effect of improving filtration properties cannot be observed, thus being unfavorable. Also, when the emulsion polymer is more than 100 parts by weight based on 100 parts by weight of the suspension polymer, the water content after dehydration of the obtained polymer becomes high, thus being unfavorable.

Herein, coating refers not only to coating the entire surface of the suspension polymer particles with the emulsion polymer but also to partially coating the surface of the polymer particles with the emulsion polymer.

By coating the suspension polymer particles with the emulsion polymer, the average particle size of the suspension polymer particles become 3 to 50% larger than before coating. When the difference in the average particle size is less than 3%, fine particle polymers remain in the system and as a result, the effect of improving filtration properties cannot be observed.

At least 50%, more preferably at least 60%, of the surface of the suspension polymer particles are coated by the emulsion polymer. When the coated area is less than 50%, the powder properties of the recovered thermoplastic polymer particles for molding tend to become poor.

Also, in the thermoplastic polymer particles obtained by the present invention, all of the suspension polymer particles do not need to be coated with the emulsion polymer. Remaining suspension polymer particles, which are not coated with the emulsion polymer, and remaining emulsion polymer particles, which did not coat the suspension polymer particles, can be included.

In order to prepare the thermoplastic polymer particles for molding of the present invention, when the proportion of the emulsion polymer latex within the mixture of the suspension of a suspension polymer and the emulsion polymer latex is high, when the speed of adding the electrolytic aqueous solution is extremely fast or when the concentration of the electrolytic aqueous solution is extremely high, a significant increase in viscosity may be observed when adding the electrolytic aqueous solution. In such a case, a process to reduce the viscosity of the system to a degree by which the usual stirring state can be maintained can be conducted, such as adding water accordingly to the system. Naturally, the amount of the electrolytic aqueous solution differs depending on the proportion of the emulsion polymer within the mixture of the suspension of a suspension polymer and the emulsion polymer latex. The amount by which uncoagulated emulsion polymer particles becomes nonexistent or more can be added after thermal treatment.

When preparing the particle polymer composition of the present invention, polymer particles of a low water content cannot be obtained by simply adding the electrolytic aqueous solution to the mixture of the suspension of a suspension polymer and the emulsion polymer latex. Thermal treatment at 50 to 120° C. is preferably conducted, after neutralizing with alkali such as sodium hydroxide, in the case that the electrolytic aqueous solution is an acidic aqueous solution and the suspension after granulation is acidic, or as it is, in the case that the electrolytic aqueous solution is a neutral aqueous solution. Consequently, the coagulate of emulsion polymer particles, which coat the surface of the suspension polymer particles, become dense and the water content of the polymer particles decrease. Then, when dehydration and drying are conducted according to the usual method, the polymer particles of the present invention are obtained.

Hereinafter, the present invention is described in detail based on Examples, but the present invention is not limited thereto.

Evaluation of filtration properties, evaluation of the color of filtration wastewater, quantification of the content of the fine particle polymer component and measurement of water content after dehydration of the suspension of polymer particles obtained in the following Examples and Comparative Examples were conducted by the following methods.

(Filtration Properties)

500 g (solid content concentration: approximately 30% by weight) of the suspension of polymer particles obtained in Examples and Comparative Examples were subjected to suction filtration with an aspirator using a Nutsche with an inner aperture of 110 mm and filtration paper with a diameter of 110 mm (defined in JIS P 3801, retention characteristic of 5 µm, water filtering time of 80 seconds) and evaluated as follows.

| | |
|---|---|
| Approximately 350 ml of water was filtered within 10 seconds | ○ |
| Approximately 350 ml of water was filtered in 10 to 60 seconds | Δ |
| Approximately 350 ml of water was filtered in 60 seconds or more | X |

(Color of Filtration Wastewater)

The filtration wastewater obtained when 500 g (solid content concentration: approximately 30% by weight) of the suspension of polymer particles obtained in Examples and Comparative Examples were subjected to suction filtration with an aspirator using a Nutsche with an inner aperture of 110 mm and filtration paper with a diameter of 110 mm (defined in JIS P 3801, retained particle size of 5 µm, water filtering time of 80 seconds) was measured for turbidity at a wavelength of 546 nm using a spectrophotometer (made by Hitachi, Ltd., U-2000) and evaluated as follows based on the color of the filtration wastewater.

| | |
|---|---|
| Turbidity is less than 5% | ○ |
| Turbidity is 5 to 25% | Δ |
| Turbidity is more than 25% | X |

(Content of Fine Particle Polymer Component)

500 g (solid content concentration: approximately 30% by weight) of the suspension of polymer particles obtained in Examples and Comparative Examples were left still at 25° C. for 24 hours. 10 g of the supernatant of the suspension were obtained and placed in a 100° C. hot-air convention dryer for 12 hours to evaporate the water. The content of the fine particle polymer component was found from Equation 1, in which the weight of the supernatant before drying was represented as W1 and the weight after drying was represented as W2.

$$\text{content of fine particle polymer component (\%)} = (W2/W1) \times 100 \qquad \text{Equation 1}$$

(Measurement of Water Content After Dehydration)

After 30 g (solid content concentration: 30% by weight) of the polymer suspension obtained in Examples and Comparative Examples were subjected to suction filtration with an aspirator, the dehydrated resin was recovered and placed in a 100° C. hot-air convention dryer for 12 hours to evaporate the water. The water content after dehydration was found from Equation 2, in which the weight of the resin immediately after dehydrating and before drying was represented as Ww and the weight of the resin after drying was represented as Wd.

$$\text{water content after dehydration (\%)} = [(Ww - Wd)/Wd] \times 100 \qquad \text{Equation 2}$$

Parts and % used in the following Examples and Comparative Examples respectively represent parts by weight and % by weight.

(Measurement of Glass Transition Temperature)

The glass transition temperature of the suspension polymer particles obtained in Examples and Comparative Examples was measured under heating conditions of 5° C./minute using a differential scanning calorimeter (made by Seiko Instruments Inc., DSC220C).

(Measurement of Vicat Softening Temperature)

Measurement of the Vicat softening temperature of the emulsion polymer was conducted based on the JIS K7206 A50 method. To prepare the specimen, the emulsion polymer obtained by polymerization was recovered by coagulation, thermally treated and drying, formed into pellets with an extrusion molder and then formed into a sheet with a press molder.

EXAMPLE 1

(Preparation of Suspension Polymer Particles)

A reaction vessel equipped with a stirrer was charged with 220 parts of deionized water and 15 parts of a 3% PVA aqueous solution (GH-20: available from The Nippon Synthetic Chemical Industry Co., Ltd.) and the inside of the reaction vessel was replaced with nitrogen. A monomer of 100 parts of butyl acrylate, in which 0.5 part of lauroyl peroxide and 0.5 part of benzoyl peroxide were dissolved, was added thereto and the rotational speed of the stirrer was adjusted so that the dispersion particle size of the monomer became approximately 250 µm. Thereafter, polymerization was completed by raising the temperature and heating the mixture in steps at 60° C. for 2 hours, 70° C. for 2 hours, 80° C. for 2 hours and 90° C. for 1 hour to prepare a suspension of a suspension polymer with a polymer solid content concentration of 30%, glass transition temperature of −53° C. and polymer particle size of 200 µm.

(Preparation of Emulsion Polymer)

A reaction vessel equipped with a stirrer was charged with 250 parts of water, 0.04 part of sodium oleate, 0.002 part of ferrous sulfate ($FeSO_4 \cdot 7H_2O$), 0.008 part of EDTA·2Na salt and 0.2 part of formaldehyde sodium sulfoxylate. After replacing with nitrogen, the reaction vessel was heated to 50° C. Then, 10% by weight of a mixture comprising 100 parts of butyl acrylate, 1 part of allyl methacrylate and 0.2 part of cumene hydroperoxide was added thereto. After 1 hour, the remaining 90% by weight of the mixture was added over 5 hours. Also, at the same time as adding the remaining mixture, a 5% aqueous solution of 1 part of potassium stearate was continuously added over 5 hours. 1 hour of polymerization was conducted and an acrylic ester rubber latex with a polymerization inversion rate of 99%, average particle size of 0.18 µm and glass transition temperature of −40° C. was obtained. Then, the reaction vessel equipped with a stirrer was charged with 275 parts of the acrylic ester rubber latex (solid content 75 parts), 0.002 part of ferrous sulfate (FeSO$_4$·7H$_2$O), 0.004 part of EDTA·2Na salt and 0.1 part of formaldehyde sodium sulfoxylate. After replacing with nitrogen, the reaction vessel was heated to 70° C. Then, a mixture comprising 23 parts of methyl methacrylate, 2 parts of butyl acrylate and 0.1 part of cumene hydroperoxide was added over 3 hours and 1 hour of post-polymerization was conducted to obtain latex of a graft copolymer obtained by emulsion polymerization (A) with an average particle size of 0.2 μm and a Vicat softening temperature of 75° C.

(Preparation of Thermoplastic Polymer Particles for Molding)

90 parts of the latex of a graft copolymer obtained by emulsion polymerization (A) (solid content 30 parts) was added to 332 parts of the suspension of a suspension polymer (solid content 100 parts) while stirring. After adjusting the mixture (solid content concentration 31%) to 50° C., 50 parts of a 1.0% calcium chloride aqueous solution was dropped over 10 minutes while stirring. Then, the mixture was heated to 90° C. while stirring and thermally treated and thermoplastic polymer particles for molding with an average particle size of 220 μm were obtained. The evaluation results of filtration properties, color of filtration wastewater, content of the fine particle polymer component and water content after dehydration of the obtained thermoplastic polymer particles for molding are shown in Table 1.

EXAMPLE 2

(Preparation of Suspension Polymer Particles)

A reaction vessel equipped with a stirrer was charged with 220 parts of deionized water and 15 parts of a 3% PVA aqueous solution (GH-20: available from The Nippon Synthetic Chemical Industry Co., Ltd.) and the inside of the reaction vessel was replaced with nitrogen. A mixed monomer of 75 parts of butyl acrylate, in which 0.5 part of lauroyl peroxide and 0.5 part of benzoyl peroxide were dissolved, and 25 parts of methyl methacrylate was added thereto and the rotational speed of the stirrer was adjusted so that the dispersion particle size of the monomer became approximately 250 μm. Thereafter, polymerization was completed by raising the temperature and heating the mixture in steps at 60° C. for 2 hours, 70° C. for 2 hours, 80° C. for 2 hours and 90° C. for 1 hour to prepare a suspension of a suspension polymer with a polymer solid content concentration of 30%, glass transition temperature of −15° C. and average particle size of 180 μm.

(Preparation of Emulsion Polymer)

Latex of a graft copolymer obtained by emulsion polymerization (A) was prepared in the same manner as in Example 1.

(Preparation of Thermoplastic Polymer Particles for Molding)

90 parts of the latex of a graft copolymer obtained by emulsion polymerization (A) (solid content 30 parts) was added to 332 parts of the suspension of a suspension polymer (B) (solid content 100 parts) while stirring. After adjusting the mixture (solid content concentration 31%) to 50° C., 50 parts of a 1.0% calcium chloride aqueous solution was dropped over 10 minutes while stirring. Then, the mixture was heated to 90° C. while stirring and thermally treated and thermoplastic polymer particles for molding with an average particle size of 200 μm were obtained. The evaluation results are shown in Table 1.

EXAMPLE 3

(Preparation of Suspension Polymer Particles)

A reaction vessel equipped with a stirrer was charged with 220 parts of deionized water and 5 parts of a 3% PVA aqueous solution (GH-20: available from The Nippon Synthetic Chemical Industry Co., Ltd.) and the inside of the reaction vessel was replaced with nitrogen. A mixed monomer of 50 parts of butyl acrylate, in which 0.5 part of lauroyl peroxide and 0.5 part of benzoyl peroxide were dissolved, and 50 parts of methyl methacrylate was added thereto and the rotational speed of the stirrer was adjusted so that the dispersion particle size of the monomer became approximately 250 μm. Thereafter, polymerization was completed by raising the temperature and heating the mixture in steps at 60° C. for 2 hours, 70° C. for 2 hours, 80° C. for 2 hours and 90° C. for 1 hour to prepare a suspension of a suspension polymer with a polymer solid content concentration of 30%, glass transition temperature of 35° C. and average particle size of 160 μm.

(Preparation of Emulsion Polymer)

Latex of a graft copolymer obtained by emulsion polymerization (A) was prepared in the same manner as in Example 1.

(Preparation of Thermoplastic Polymer Particles for Molding)

90 parts of the latex of a graft copolymer obtained by emulsion polymerization (A) (solid content 30 parts) was added to 332 parts of the suspension of a suspension polymer (solid content 100 parts) while stirring. After adjusting the mixture (solid content concentration 31%) to 50° C., 50 parts of a 1.0% calcium chloride aqueous solution was dropped over 10 minutes while stirring. Then, the mixture was heated to 90° C. while stirring and thermally treated and thermoplastic polymer particles for molding with an average particle size of 190 μm were obtained. The evaluation results are shown in Table 1.

EXAMPLE 4

(Preparation of Suspension Polymer Particles)

A reaction vessel equipped with a stirrer was charged with 220 parts of deionized water and 15 parts of a 3% PVA aqueous solution (GH-20: available from The Nippon Synthetic Chemical Industry Co., Ltd.) and the inside of the reaction vessel was replaced with nitrogen. A mixed monomer of 25 parts of butyl acrylate, in which 0.5 part of lauroyl peroxide and 0.5 part of benzoyl peroxide were dissolved, and 75 parts of methyl methacrylate was added thereto and the rotational speed of the stirrer was adjusted so that the dispersion particle size of the monomer became approximately 250 μm. Thereafter, polymerization was completed by raising the temperature and heating the mixture in steps at 60° C. for 2 hours, 70° C. for 2 hours, 80° C. for 2 hours and 90° C. for 1 hour to prepare a suspension of a suspension polymer with a polymer solid content concentration of 30%, glass transition temperature of 72° C. and average particle size of 150 μm.

(Preparation of Emulsion Polymer)

Latex of a graft copolymer obtained by emulsion polymerization (A) was prepared in the same manner as in Example 1.

(Preparation of Thermoplastic Polymer Particles for Molding)

90 parts of the latex of a graft copolymer obtained by emulsion polymerization (A) (solid content 30 parts) was added to 332 parts of the suspension of a suspension polymer (solid content 100 parts) while stirring. After adjusting the mixture (solid content concentration 31%) to 50° C., 50 parts of a 1.0% calcium chloride aqueous solution was dropped over 10 minutes while stirring. Then, the mixture was heated to 90° C. while stirring and thermally treated and thermoplastic polymer particles for molding with an average particle size of 175 μm were obtained. The evaluation results are shown in Table 1.

EXAMPLE 5

(Preparation of Suspension Polymer Particles)

A reaction vessel equipped with a stirrer was charged with 220 parts of deionized water and 5 parts of a 3% PVA aqueous solution (GH-20: available from The Nippon Synthetic Chemical Industry Co., Ltd.) and the inside of the reaction vessel was replaced with nitrogen. A monomer of 100 parts of methyl methacrylate, in which 0.5 part of lauroyl peroxide and 0.5 part of benzoyl peroxide were dissolved, was added thereto and the rotational speed of the stirrer was adjusted so that the dispersion particle size of the monomer became approximately 250 μm. Thereafter, polymerization was completed by raising the temperature and heating the mixture in steps at 60° C. for 2 hours, 70° C. for 2 hours, 80° C. for 2 hours and 90° C. for 1 hour to prepare a suspension of a suspension polymer with a polymer solid content concentration of 30%, glass transition temperature of 105° C. and polymer particle size of 150 μm.

(Preparation of Emulsion Polymer)

Latex of a graft copolymer obtained by emulsion polymerization (A) was prepared in the same manner as in Example 1.

(Preparation of Thermoplastic Polymer Particles for Molding)

90 parts of the latex of a graft copolymer obtained by emulsion polymerization (A) (solid content 30 parts) was added to 332 parts of the suspension of a suspension polymer (solid content 100 parts) while stirring. After adjusting the mixture (solid content concentration 31%) to 50° C., 50 parts of a 1.0% calcium chloride aqueous solution was dropped over 10 minutes while stirring. Then, the mixture was heated to 90° C. while stirring and thermally treated and thermoplastic polymer particles for molding with an average particle size of 180 μm were obtained. The evaluation results are shown in Table 1.

EXAMPLE 6

(Preparation of Suspension Polymer Particles)

The suspension of a suspension polymer was prepared in the same manner as in Example 4.

(Preparation of Emulsion Polymer)

Latex of a graft copolymer obtained by emulsion polymerization (A) was prepared in the same manner as in Example 1.

(Preparation of Thermoplastic Polymer Particles for Molding)

67 parts of the latex of a graft copolymer obtained by emulsion polymerization (A) (solid content 22 parts) was added to 332 parts of the suspension of a suspension polymer (solid content 100 parts) while stirring. After adjusting the mixture (solid content concentration 31%) to 50° C., 50 parts of a 1.0% calcium chloride aqueous solution was dropped over 10 minutes while stirring. Then, the mixture was heated to 90° C. while stirring and thermally treated and thermoplastic polymer particles for molding with an average particle size of 170 μm were obtained. The evaluation results are shown in Table 1.

EXAMPLE 7

(Preparation of Suspension Polymer Particles)

The suspension of a suspension polymer was prepared in the same manner as in Example 4.

(Preparation of Emulsion Polymer)

Latex of a graft copolymer obtained by emulsion polymerization (A) was prepared in the same manner as in Example 1.

(Preparation of Thermoplastic Polymer Particles for Molding)

152 parts of the latex of a graft copolymer obtained by emulsion polymerization (A) (solid content 50 parts) was added to 332 parts of the suspension of a suspension polymer (solid content 100 parts) while stirring. After adding 75 parts of deionized water to the mixture (solid content concentration 27%), the mixture was adjusted to 50° C. and 100 parts of a 1.0% calcium chloride aqueous solution was dropped over 20 minutes while stirring. Then, the mixture was heated to 90° C. while stirring and thermally treated and thermoplastic polymer particles for molding with an average particle size of 180 μm were obtained. The evaluation results are shown in Table 1.

EXAMPLE 8

(Preparation of Suspension Polymer Particles)

The suspension of a suspension polymer was prepared in the same manner as in Example 4.

(Preparation of Emulsion Polymer)

Latex of a graft copolymer obtained by emulsion polymerization (A) was prepared in the same manner as in Example 1.

(Preparation of Thermoplastic Polymer Particles for Molding)

304 parts of the latex of a graft copolymer obtained by emulsion polymerization (A) (solid content 100 parts) was added to 332 parts of the suspension of a suspension polymer (solid content 100 parts) while stirring. After adding 150 parts of deionized water to the mixture (solid content concentration 25%), the mixture was adjusted to 50° C. and 100 parts of a 1.0% calcium chloride aqueous solution was dropped over 30 minutes while stirring. Then, the mixture was heated to 90° C. while stirring and thermally treated and thermoplastic polymer particles for molding with an average particle size of 190 μm were obtained. The evaluation results are shown in Table 1.

EXAMPLE 9

(Preparation of Suspension Polymer Particles)

The suspension of a suspension polymer was prepared in the same manner as in Example 4.

(Preparation of Emulsion Polymer)

A reaction vessel equipped with a stirrer was charged with 220 parts of deionized water, 0.3 part of boric acid, 0.03 part of sodium carbonate, 0.09 part of N-lauroyl sodium sarcosinate, 0.09 part of formaldehyde sodium sulfoxylate, 0.006 part of EDTA·2Na salt and 0.002 part of ferrous sulfate ($FeSO_4 \cdot 7H_2O$). After replacing with nitrogen, the reaction vessel was heated to 80° C. Then, 25% of a monomer mixture comprising 25 parts of methyl methacrylate, 0.1 part of allyl methacrylate and 0.1 part of t-butylhydroperoxide was added thereto at once and polymerization was conducted for 45 minutes. Then, the remaining 75% by weight of the mixture was continuously added over 1 hour. After the mixture was added, the temperature was maintained for 2 hours to complete polymerization. During this time, 0.2 part by weight of N-lauroyl sodium sarcosinate was added. The average particle size of the polymer particles in the obtained latex of a methacrylic polymer in which the innermost layer is crosslinked was 1600 Å (found by using light scattering of a wavelength of 546 nm) and the polymerization inversion rate was 98% (amount of produced polymers/amount of charged monomers×100). Then, the obtained crosslinking methacrylic polymer latex was maintained at 80° C. in a nitrogen gas current and after adding 0.1 part by weight of potassium persulfate, a monomer mixture comprising 41 parts by weight of n-butyl acrylate, 9 parts by weight of styrene and 1 part by weight of allyl methacrylate was continuously added over 5 hours. During this time, 0.1 part by weight of potassium oleate was added in 3 parts. After the monomer mixture was added, 0.05 part by weight of potassium persulfate was added and maintained for 2 hours to complete polymerization. The average particle size of the obtained polymer was 2300 Å and the polymerization inversion rate was 99%. Then, the obtained rubbery polymer latex was maintained at 80° C. and after 0.02 part by weight of potassium persulfate was added, a mixture of 24 parts by weight of methyl methacrylate, 1 part by weight of n-butyl acrylate and 0.1 part by weight of t-dodecyl mercaptan was added continuously over 1 hour. After the monomer mixture was added, the mixture was maintained for 1 hour and latex of a graft copolymer obtained by emulsion polymerization (B) having a multi-layer structure with an average particle size of 0.25 μm and a Vicat softening temperature of 90° C. was obtained.

(Preparation of Thermoplastic Polymer Particles for Molding)

96 parts of the latex of a graft copolymer obtained by emulsion polymerization (B) (solid content 30 parts) was added to 332 parts of the suspension (solid content 100 parts) while stirring. After adjusting the mixture to 60° C. (solid content concentration 30%), 50 parts of a 1.0% calcium chloride aqueous solution was dropped over 10 minutes while stirring. Then, the mixture was heated to 95° C. while stirring and thermally treated and thermoplastic polymer particles for molding with an average particle size of 180 μm were obtained. The evaluation results are shown in Table 1.

EXAMPLE 10

(Preparation of Suspension Polymer Particles)

The suspension of a suspension polymer was prepared in the same manner as in Example 4.

(Preparation of Emulsion Polymer)

A reaction vessel equipped with a stirrer was charged with 200 parts of deionized water, 1 part of sodium dioctyl sulfosuccinate and 0.03 part of potassium persulfate. After replacing with nitrogen, the reaction vessel was heated to 65° C. Then, a monomer mixture comprising 84 parts of methyl methacrylate and 16 parts of butyl methacrylate was added over 4 hours and heating and stirring were continued for 1 hour to substantially complete the polymerization reaction. Then, a monomer mixture comprising 11 parts of butyl acrylate and 9 parts of methyl methacrylate was added over 1 hour and polymerization was conducted for 1.5 hours at 65° C. to obtain latex of a graft copolymer obtained by emulsion polymerization (C) with an average particle size of 0.1 μm and a Vicat softening temperature of 90° C.

(Preparation of Thermoplastic Polymer Particles for Molding)

67 parts of the latex of a graft copolymer obtained by emulsion polymerization (C) (solid content 25 parts) was added to 332 parts of the suspension of a suspension polymer (solid content 100 parts) while stirring. After adjusting the mixture to 70° C. (solid content concentration 31%), 50 parts of a 1.0% calcium chloride aqueous solution was dropped over 10 minutes while stirring. Then, the mixture was heated to 95° C. while stirring and thermally treated and thermoplastic polymer particles for molding with an average particle size of 180 μm were obtained. The evaluation results are shown in Table 1.

EXAMPLE 11

(Preparation of Suspension Polymer Particles)

A reaction vessel equipped with a stirrer was charged with 220 parts of deionized water and 15 parts of a 3% PVA aqueous solution (GH-20: available from The Nippon Synthetic Chemical Industry Co., Ltd.) and the inside of the reaction vessel was replaced with nitrogen. A mixed monomer comprising 25 parts of butyl acrylate, in which 0.5 part of lauroyl peroxide and 0.5 part of benzoyl peroxide were dissolved, 75 parts of methyl methacrylate and 0.3 part of t-dodecylmercaptan (tDM) was added thereto and the rotational speed of the stirrer was adjusted so that the dispersion particle size of the monomer became approximately 250 μm. Thereafter, polymerization was completed by raising the temperature and heating the mixture in steps at 60° C. for 2 hours, 70° C. for 2 hours, 80° C. for 2 hours and 90° C. for 1 hour to prepare a suspension of a suspension polymer with a polymer solid content concentration of 30%, glass transition temperature of 72° C. and polymer particle size of 150 μm.

(Preparation of Emulsion Polymer)

Latex of a graft copolymer obtained by emulsion polymerization (A) was prepared in the same manner as in Example 1.

(Preparation of Thermoplastic Polymer Particles for Molding)

90 parts of the latex of a graft copolymer obtained by emulsion polymerization (A) (solid content 30 parts) was added to 333 parts of the suspension of a suspension polymer (solid content 100 parts) while stirring. After adjusting the mixture (solid content concentration 31%) to 50° C., 50 parts of a 1.0% calcium chloride aqueous solution was dropped over 10 minutes while stirring. Then, the mixture was heated to 90° C. while stirring and thermally treated and thermoplastic polymer particles for molding with an average particle size of 175 μm were obtained. The evaluation results are shown in Table 1.

Comparative Example 1

(Preparation of Suspension Polymer Particles)

The suspension of a suspension polymer was prepared in the same manner as in Example 4. The results are shown in Table 2.

Comparative Example 2

(Preparation of Suspension Polymer Particles)

The suspension of a suspension polymer was prepared in the same manner as in Example 4. After adjusting 332 parts of the obtained suspension of a suspension polymer (solid content 100 parts) to 50° C., 50 parts of a 1.0% calcium chloride aqueous solution was dropped over 10 minutes while stirring. Then, the mixture was heated to 90° C. while stirring and thermally treatment was conducted. The average particle size of the obtained polymer particles was 175 µm. The results are shown in Table 2.

Comparative Example 3

(Preparation of Suspension Polymer Particles)

The suspension of a suspension polymer was prepared in the same manner as in Example 4.

(Preparation of Emulsion Polymer)

Latex of a graft copolymer obtained by emulsion polymerization (A) was prepared in the same manner as in Example 1.

(Preparation of Thermoplastic Polymer Particles for Molding)

30 parts of the latex of a graft copolymer obtained by emulsion polymerization (A) (solid content 10 parts) was added to 332 parts of the suspension of a suspension polymer (solid content 100 parts) while stirring. After adjusting the mixture (solid content concentration 30%) to 50° C., 50 parts of a 1.0% calcium chloride aqueous solution was dropped over 10 minutes while stirring. Then, the mixture was heated to 90° C. while stirring and thermally treated and thermoplastic polymer particles for molding with an average particle size of 165 µm were obtained. The evaluation results are shown in Table 2.

Comparative Example 4

(Preparation of Suspension Polymer Particles)

The suspension of a suspension polymer was prepared in the same manner as in Example 4.

(Preparation of Emulsion Polymer)

Latex of a graft copolymer obtained by emulsion polymerization (B) was prepared in the same manner as in Example 9.

(Preparation of Thermoplastic Polymer Particles for Molding)

64 parts of the latex of a graft copolymer obtained by emulsion polymerization (B) (solid content 20 parts) was added to 332 parts of the suspension of a suspension polymer (solid content 100 parts) while stirring. After adjusting the mixture (solid content concentration 30%) to 50° C., 50 parts of a 1.0% calcium chloride aqueous solution was dropped over 10 minutes while stirring. Then, the mixture was heated to 95° C. while stirring and thermally treated and thermoplastic polymer particles for molding with an average particle size of 170 µm were obtained. The evaluation results are shown in Table 2.

Comparative Example 5

(Preparation of Suspension Polymer Particles)

The suspension of a suspension polymer was prepared in the same manner as in Comparative Example 1.

(Preparation of Emulsion Polymer)

Latex of a graft copolymer obtained by emulsion polymerization (A) was prepared in the same manner as in Example 1.

(Preparation of Thermoplastic Polymer Particles for Molding)

360 parts of the latex of a graft copolymer obtained by emulsion polymerization (A) (solid content 120 parts) was added to 332 parts of the suspension of a suspension polymer (solid content 100 parts) while stirring. After adding 190 parts of deionized water to the mixture (solid content concentration 25%), the mixture was adjusted to 50° C. and 100 parts of a 1.0% calcium chloride aqueous solution was dropped over 30 minutes while stirring. Then, the mixture was heated to 90° C. while stirring and thermally treated and thermoplastic polymer particles for molding with an average particle size of 200 µm were obtained. The evaluation results are shown in Table 2.

Comparative Example 6

(Preparation of Emulsion Polymer)

Latex of a graft copolymer obtained by emulsion polymerization (A) was prepared in the same manner as in Example 1. Then, 65 parts of water were added to 100 parts of latex of a graft copolymer obtained by emulsion polymerization (A) (solid content 33 parts) and 50 parts of a 3% calcium chloride aqueous solution was added while stirring at 40° C. and the coagulation process was conducted. The suspension of particles obtained by coagulating a emulsion polymer latex obtained thereby was heated to 90° C. and thermally treated. The particle size of the obtained polymer was 150 µm. The evaluation results are shown in Table 2.

Comparative Example 7

(Preparation of Emulsion Polymer)

Latex of a graft copolymer obtained by emulsion polymerization (B) was prepared in the same manner as in Example 9. Then, 65 parts of water were added to 100 parts of latex of a graft copolymer obtained by emulsion polymerization (B) (solid content 33 parts) and 50 parts of a 3% calcium chloride aqueous solution was added while stirring at 55° C. and the coagulation process was conducted. The suspension of particles obtained by coagulating a emulsion polymer latex obtained thereby was heated to 95° C. and thermally treated. The particle size of the obtained polymer was 132 µm. The evaluation results are shown in Table 2.

Comparative Example 8

(Preparation of Emulsion Polymer)

Latex of a graft copolymer obtained by emulsion polymerization (C) was prepared in the same manner as in Example 10. Then, 65 parts of water were added to 100 parts of latex of a graft copolymer obtained by emulsion polymerization (C) (solid content 33 parts) and 50 parts of a 3% calcium chloride aqueous solution was added while stirring at 55° C. and the coagulation process was conducted. The suspension of particles obtained by coagulating a emulsion polymer latex obtained thereby was heated to 95° C. and thermally treated. The particle size of the obtained polymer was 125 μm. The evaluation results are shown in Table 2.

Comparative Example 9

(Preparation of Suspension Polymer Particles)

The suspension of a suspension polymer was prepared in the same manner as in Example 4.

(Preparation of Emulsion Polymer)

Latex of a graft copolymer obtained by emulsion polymerization (A) with a Vicat softening temperature of 75° C. was prepared in the same manner as in Example 1.

(Preparation of Thermoplastic Polymer Particles for Molding)

90 parts of the latex of a graft copolymer obtained by emulsion polymerization (A) (solid content 30 parts) was added to 332 parts of the suspension of a suspension polymer (solid content 100 parts) while stirring. After adjusting the mixture (solid content concentration 31%) to 80° C., 50 parts of a 1.0% calcium chloride aqueous solution was dropped over 10 minutes while stirring. Then, the mixture was heated to 90° C. while stirring and thermally treated and thermoplastic polymer particles for molding with an average particle size of 1200 μm were obtained. The evaluation results are shown in Table 2.

Comparative Example 10

(Preparation of Suspension Polymer Particles)

The suspension of a suspension polymer was prepared in the same manner as in Example 4.

(Preparation of Emulsion Polymer)

Latex of a graft copolymer obtained by emulsion polymerization (A) with a Vicat softening temperature of 75° C. was prepared in the same manner as in Example 1.

(Preparation of Thermoplastic Polymer Particles for Molding)

After adjusting 332 parts of the obtained suspension of a suspension polymer (solid content 100 parts) to 50° C., 50 parts of a 1.0% calcium chloride aqueous solution and then 90 parts of latex of a graft copolymer obtained by emulsion polymerization (A) (solid content 30 parts) were added (solid content concentration 28%). Then, the mixture was heated to 90° C. while stirring and thermally treated and thermoplastic polymer particles for molding with an average particle size of 210 μm were obtained. The evaluation results are shown in Table 2.

Comparative Example 11

(Preparation of Suspension Polymer Particles)

The suspension of a suspension polymer was prepared in the same manner as in Example 4.

(Preparation of Emulsion Polymer)

Latex of a graft copolymer obtained by emulsion polymerization (A) was prepared in the same manner as in Example 1.

(Preparation of Thermoplastic Polymer Particles for Molding)

90 parts of the latex of a graft copolymer obtained by emulsion polymerization (A) (solid content 30 parts) was added to 332 parts of the suspension of a suspension polymer (solid content 100 parts) while stirring. After adding 150 parts of deionized water to the mixture (solid content concentration 23%), the mixture was adjusted to 50° C. and 100 parts of a 1.0% calcium chloride aqueous solution was dropped over 30 minutes while stirring. Then, the mixture was heated to 90° C. while stirring and thermally treated and thermoplastic polymer particles for molding with an average particle size of 180 μm were obtained. The evaluation results are shown in Table 2.

Comparative Example 12

(Preparation of Suspension Polymer Particles)

A reaction vessel equipped with a stirrer was charged with 150 parts of deionized water and 15 parts of a 3% PVA aqueous solution (GH-20: available from The Nippon Synthetic Chemical Industry Co., Ltd.) and the inside of the reaction vessel was replaced with nitrogen. A mixed monomer comprising 25 parts of butyl acrylate, in which 0.5 part of lauroyl peroxide and 0.5 part of benzoyl peroxide were dissolved, and 75 parts of methyl methacrylate was added thereto and the rotational speed of the stirrer was adjusted so that the dispersion particle size of the monomer became approximately 250 μm. Thereafter, polymerization was completed by raising the temperature and heating the mixture in steps at 60° C. for 2 hours, 70° C. for 2 hours, 80° C. for 2 hours and 90° C. for 1 hour to prepare a suspension of a suspension polymer with a polymer solid content concentration of 38%, glass transition temperature of 72° C. and polymer particle size of 150 μm.

(Preparation of Emulsion Polymer)

Latex of a graft copolymer obtained by emulsion polymerization (A) was prepared in the same manner as in Example 1.

(Preparation of Thermoplastic Polymer Particles for Molding)

90 parts of the latex of a graft copolymer obtained by emulsion polymerization (A) (solid content 30 parts) was added to 263 parts of the suspension of a suspension polymer (solid content 100 parts) while stirring. After adjusting the mixture (solid content concentration 37%) to 50° C., 50 parts of a 1.0% calcium chloride aqueous solution was dropped over 10 minutes while stirring. Then, the mixture was heated to 90° C. while stirring and thermally treated and thermoplastic polymer particles for molding with an average particle size of 250 μm were obtained.

TABLE 1

| | Composition of Suspension Polymer | Type of Emulsion Polymer Latex | Suspension Polymer/ Emulsion Polymer Weight Ratio | Filtration Properties | Color of Filtration Wastewater | Content of Fine Particle Polymer Component % | Water Content after Dehydration % |
|---|---|---|---|---|---|---|---|
| Ex. 1 | MMA/BA = 0/100 | A | 100/30 | ○ | ○ | 0.2 | 18 |
| Ex. 2 | MMA/BA = 25/75 | A | 100/30 | ○ | ○ | 0.2 | 16 |
| Ex. 3 | MMA/BA = 50/50 | A | 100/30 | ○ | ○ | 0.3 | 18 |
| Ex. 4 | MMA/BA = 75/25 | A | 100/30 | ○ | ○ | 0.3 | 17 |
| Ex. 5 | MMA/BA = 100/0 | A | 100/30 | ○ | ○ | 0.3 | 18 |
| Ex. 6 | MMA/BA = 25/75 | A | 100/22 | ○ | ○ | 0.4 | 14 |
| Ex. 7 | MMA/BA = 25/75 | A | 100/50 | ○ | ○ | 0.2 | 24 |
| Ex. 8 | MMA/BA = 25/75 | A | 100/100 | ○ | ○ | 0.2 | 34 |
| Ex. 9 | MMA/BA = 75/25 | B | 100/30 | ○ | ○ | 0.4 | 28 |
| Ex. 10 | MMA/BA = 75/25 | C | 100/25 | ○ | ○ | 0.2 | 28 |
| Ex. 11 | MMA/BA/tDM = 75/25/0.3 | A | 100/30 | ○ | ○ | 0.2 | 19 |

TABLE 2

| | Composition of Suspension Polymer | Type of Emulsion Polymer Latex | Suspension Polymer/ Emulsion Polymer Weight Ratio | Filtration Properties | Color of Filtration Wastewater | Content of Fine Particle Polymer Component % | Water Content after Dehydration % |
|---|---|---|---|---|---|---|---|
| Com. Ex. 1 | MMA/BA = 75/25 | — | 100/0 | X | X | 3.5 | Unable to filter |
| Com. Ex. 2 | MMA/BA = 75/25 | — | 100/0 | X | X | 3.3 | Unable to filter |
| Com. Ex. 3 | MMA/BA = 75/25 | A | 100/10 | Δ | Δ | 1.4 | 13 |
| Com. Ex. 4 | MMA/BA = 75/25 | B | 100/20 | Δ | X | 1.7 | 25 |
| Com. Ex. 5 | MMA/BA = 75/25 | A | 100/120 | ○ | ○ | 0.1 | 38 |
| Com. Ex. 6 | — | A | 0/100 | ○ | ○ | 0.1 | 38 |
| Com. Ex. 7 | — | B | 0/100 | ○ | ○ | 0.1 | 48 |
| Com. Ex. 8 | — | C | 0/100 | ○ | ○ | 0.1 | 45 |
| Com. Ex. 9 | MMA/BA = 75/25 | A | 100/30 | X | X | 5.8 | Unable to filter |
| Com. Ex. 10 | MMA/BA = 75/25 | A | 100/30 | Δ | X | 1.7 | 42 |
| Com. Ex. 11 | MMA/BA = 75/25 | A | 100/30 | Δ | Δ | 0.8 | 24 |
| Com. Ex. 12 | MMA/BA = 75/25 | A | 100/30 | ○ | ○ | 0.2 | 55 |

From the above results, when observing the content of the fine particle polymer component, in comparison to Comparative Examples 1 and 2 in which only suspension polymerization was conducted, the polymer particle compositions of Examples 1 to 11 of the present invention were found to have a small amount of fine particle polymers in the polymer suspension and as a result, the filtration properties of the suspension of polymer particles were found to be extremely favorable and the filtration wastewater was found to be transparent. Also, from Examples 1 to 11 and Comparative Examples 3 and 4 of the present invention, when the coating of the emulsion polymer was less than 22 parts by weight based on 100 parts by weight of the suspension polymer, fine particle polymers were found to remain in the suspension of polymer particles, as the effect of improving filtration properties was low and the filtration wastewater was clouded. From Comparative Example 9, when the electrolytic aqueous solution was added to the mixture of the suspension of a suspension polymer and the emulsion polymer latex at a temperature higher than the Vicat softening temperature of the emulsion polymer, an extremely large amount of fine particle polymers were found to remain in the obtained suspension of polymer particles. Furthermore, from Comparative Example 11, when the suspension of the polymer mixture of the suspension polymer and the emulsion polymer was contacted with the electrolytic aqueous solution when the solid content concentration of polymer particles was less than 25%, filtration properties were found to become poor and water content after dehydration was found to become high, as extremely small coagulates with a particle size of at most 50 μm developed in the polymer suspension after the electrolytic aqueous solution was added and thermal treatment was conducted. Also, from Comparative Example 12, when the suspension of the polymer mixture of the suspension polymer and the emulsion polymer was contacted with the electrolytic aqueous solution when the solid content concentration of polymer particles was more than 35%, water content after dehydration was found to become high, as coagulated particles comprising the suspension polymer and emulsion polymer often develop.

On the other hand, when observing the water content after dehydration of the polymer particles, in comparison to Comparative Examples 6 to 8 in which the emulsion polymer latex was recovered by only the conventional coagulation process, the polymer particle compositions of Examples 1 to 11 of the present invention were found to have an extremely low water content after dehydration and to be able to significantly reduce the amount of energy consumption when drying. Also, the polymer particles of Comparative Example 5, in which 100 parts by weight of a suspension polymer were coated with at least 100 parts by weight of an emulsion polymer, did not differ with Comparative Examples 6 to 8, in which the emulsion polymer latex was recovered by only the conventional coagulation process, with respect to the water content after dehydration and therefore were not found to be superior in terms of reducing dry load. Furthermore, from Comparative Example 10, when the suspension of a suspension polymer and the emulsion polymer latex were mixed in the presence of the electrolytic aqueous solution, fine particle polymers were found to remain in the obtained suspension of polymer particles and also, the shape of the produced polymer particles were distorted and the water content after dehydration was found to become extremely high.

The sheet obtained by molding the thermoplastic polymer particles for molding of Examples 1 to 11 of the present invention was found to have a surface hardness of at least 70, which is sufficient for using as a suspension polymer.

Herein, FIG. 1 is a graph depicting the particle size distribution of the suspension polymer particles and thermoplastic polymer particles for molding obtained in Example 2 and the coagulated particles of the emulsion polymer alone obtained in Comparative Example 7.

In FIG. 1, (A) represents the particle size distribution of the suspension polymer particles, (B) represents the particle size distribution of the thermoplastic polymer particles for molding and (C) represents the particle size distribution of the coagulated particles of the emulsion polymer alone.

The average particle size of the suspension polymer particles was 180 μm, the average particle size of the thermoplastic polymer particles for molding was 200 μm and the average particle size of the coagulated particles of the emulsion polymer alone was 132 μm. Therefore, the particle size distribution of the thermoplastic polymer particles for molding was found to shift approximately 20 μm to the large particle size side compared to the suspension polymer particles. Also, in comparison to the suspension polymer particles, the thermoplastic polymer particles for molding were found to have extremely few particles with a particle size of at most 50 μm, which cause filtration properties to become poor.

The horizontal axis of FIG. 1 represents particle size distribution (μm) and the vertical axis represents frequency (%).

Figure 2:
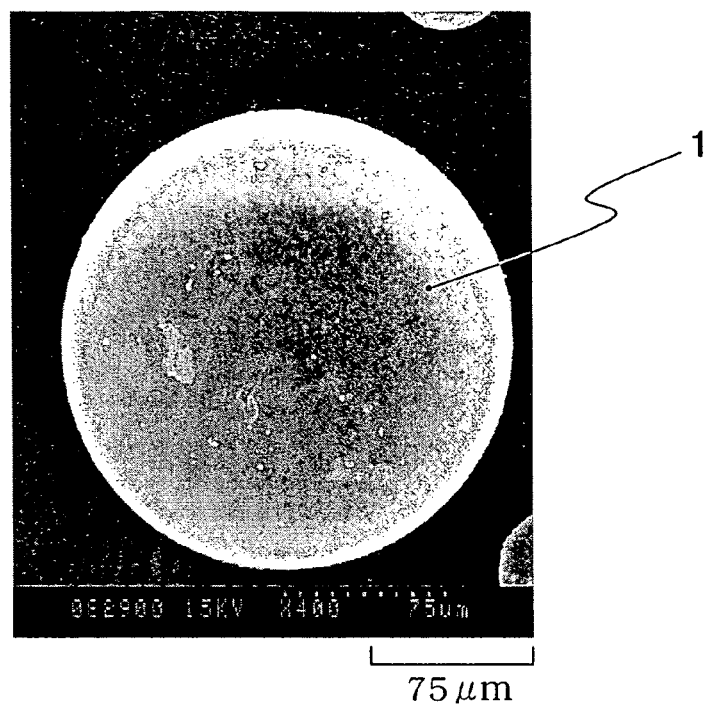
FIG. 2(a) is an image of suspension polymer particles observed by a 400 times electron microscope.
FIG. 2(b) is an image of the coated polymer particles of the present invention observed by a 150 times electron microscope.
Figure 2:
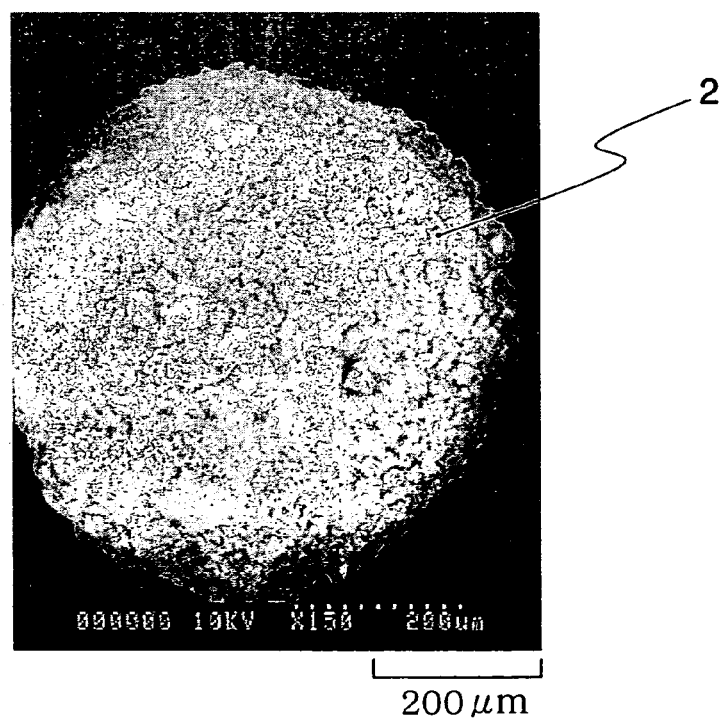

FIG. 2 is a photograph which represents the surface state of the suspension polymer particles and thermoplastic polymer particles for molding obtained in Example 3. In FIG. 2, (a) represents the suspension polymer particles and (b) represents the thermoplastic polymer particles for molding. The surface of suspension polymer particle 1 is coated with the emulsion polymer to obtain the thermoplastic polymer particle for molding 2. Photography was conducted by a scanning electron microscope (made by Hitachi, Ltd., S-800).

INDUSTRIAL APPLICABILITY

The process for preparing the polymer particles of the present invention achieves a process for preparing which can solve all at once, the problem of fine powder caused by suspension polymerization process, the problem of reducing energy consumption when drying caused by emulsion polymerization process and the problem of the compounding process for processors.

The invention claimed is:

1. A process for preparing a thermoplastic polymer particle for molding which comprises mixing a suspension comprising a suspension polymer having an average particle size of 50 to 500 m and an emulsion polymer latex in a proportion of 22 to 100 parts by weight of an emulsion polymer based on 100 parts by weight of a suspension polymer particle;

adjusting solid content concentration of polymer particles within said suspension of the polymer mixture to 25 to 35% by weight;

contacting said mixture with an electrolytic aqueous solution at the Vicat softening temperature of said emulsion polymer or lower;

heating to said Vicat softening temperature or higher; and recovering said polymer particles by solid-liquid separation.

2. The process for preparing a thermoplastic polymer particle for molding of 1, wherein said emulsion polymer is 25 to 100 parts by weight.

3. The process for preparing a thermoplastic polymer particle for molding of claim 1, wherein said emulsion polymer is 30 to 100 parts by weight.

4. The process for preparing a thermoplastic polymer particle for molding of claim 1, wherein solid content concentration of said polymer particles in said mixture comprising said suspension of a suspension polymer and said emulsion polymer latex is 27 to 33 % by weight.

5. The process for preparing a thermoplastic polymer particle for molding of claim 1, wherein said suspension polymer particle comprises 30 to 100% by weight of (meth) acrylic ester and 0 to 70% by weight of a vinyl monomer copolymerizable therewith.

6. The process for preparing a thermoplastic polymer particle for molding of claim 1, wherein said emulsion polymer particle is obtained by graft polymerizing 50 to 90 parts by weight of solid content of a rubber latex comprising 50 to 100% by weight of (meth)acrylic ester, 0 to 40% by weight an aromatic vinyl monomer, 0 to 10% by weight of a vinyl monomer copolymerizable therewith and 0 to 5% by weight of a multifunctional monomer and having a glass transition temperature of at most 0° C., and 10 to 50 parts by weight of a monomer mixture comprising 10 to 100% by weight of methacrylic ester, 0 to 90% by weight of an aromatic vinyl monomer, 0 to 25% by weight of a cyanized vinyl monomer and 0 to 20% by weight of a vinyl monomer copolymerizable therewith.

7. The process for preparing a thermoplastic polymer particle for molding of claim 1, wherein said emulsion polymer latex is a polymer obtained by emulsion polymerizing 70 to 95 parts by weight of a mixture comprising 50 to 95% by weight of methyl methacrylate, 5 to 50% by weight of methacrylic ester having an alkyl group of 2 to 8 carbon atoms and 0 to 20% by weight of a vinyl monomer copolymerizable therewith;

adding 5 to 30 parts by weight of a mixture comprising 20 to 80% by weight of at least one monomer selected from the group consisting of acrylic ester and methacrylic ester excluding methyl methacrylate, 20 to 80% by weight of methyl methacrylate and 0 to 20% by weight of a vinyl monomer copolymerizable therewith, so that the total amount becomes 100 parts by weight in the presence of said obtained polymer latex; and then graft polymerizing.

8. The process for preparing a thermoplastic polymer particle for molding of claim 1, wherein said emulsion polymer latex is an emulsion polymer having a 3 layer structure prepared by obtaining a 2 layer polymer latex by polymerizing 40 to 90 parts by weight of a monomer mixture comprising 60 to 99.9% by weight of alkyl acrylate, 0 to 39.9% by weight of a vinyl monomer copolymerizable therewith and 0.1 to 5% by weight of a crosslinkable monomer, in the presence of 10 to 60 parts by weight of solid content of a polymer latex obtained by polymerizing 40 to 99.99% by weight of methyl methacrylate, 0 to 59.99% by weight of a vinyl monomer copolymerizable therewith and 0.01 to 10% by weight of a crosslinkable monomer; and further polymerizing 11 to 67 parts by weight of a monomer mixture comprising 60 to 100% by weight of (meth)acrylic ester and 0 to 40% by weight of a vinyl monomer copolymerizable therewith, in the presence of 100 parts by weight of solid content of said obtained 2 layer polymer latex.

9. The process for preparing a thermoplastic polymer particle for molding of claim 1, wherein said electrolytic aqueous solution is an aqueous solution of inorganic salt.

* * * * *

UNITED STATES PATENT AND TRADEMARK OFFICE
CERTIFICATE OF CORRECTION

| | | |
|---|---|---|
| PATENT NO. | : 7,094,832 B2 | Page 1 of 1 |
| APPLICATION NO. | : 10/482869 | |
| DATED | : August 22, 2006 | |
| INVENTOR(S) | : Takashi Ueda et al. | |

It is certified that error appears in the above-identified patent and that said Letters Patent is hereby corrected as shown below:

In the Title Page: Change "PRODUCTION THEREOF" to --PREPARING THE SAME--.

| Column | Line | |
|---|---|---|
| 1 | 2 | Change "PRODUCTION THEREOF" to -- PREPARING THE SAME-- |
| 9 | 1 | Change "δ-methylstyrene" to --α-methylstyrene--. |
| 28 | 11 | Change "molding of 1" to --molding of claim 1--. |

Signed and Sealed this

Thirteenth Day of March, 2007

JON W. DUDAS
*Director of the United States Patent and Trademark Office*